United States Patent [19]

Stark

[11] 4,270,981
[45] Jun. 2, 1981

[54] SOLAR DISTILLATION APPARATUS
[75] Inventor: Virgil Stark, New York, N.Y.
[73] Assignee: North American Utility Construction Corp., New York, N.Y.
[21] Appl. No.: 915,001
[22] Filed: Jun. 13, 1978
[51] Int. Cl.³ .............................................. C02F 1/14
[52] U.S. Cl. .................................. 202/172; 202/177; 202/180; 202/234; 126/440; 203/10; 203/22; 203/25; 203/DIG. 1; 350/418; 350/452
[58] Field of Search .................... 203/DIG. 1, 10, 11, 203/100, 99, DIG. 17, 22, 23, 25; 202/176, 177, 180, 234, 232, 233, 202, 235, 172, 173; 159/1 S, 1 SF; 126/440; 350/179, 211

[56] References Cited

U.S. PATENT DOCUMENTS

| | | | |
|---|---|---|---|
| 102,633 | 5/1870 | Wheeler | 202/DIG. 1 |
| 1,302,363 | 4/1919 | Graham | 203/DIG. 1 |
| 1,599,481 | 9/1926 | Marcuse | 126/440 |
| 2,249,642 | 7/1941 | Turner | 203/DIG. 1 |
| 2,636,129 | 4/1953 | Agnew | 203/DIG. 1 |
| 2,902,028 | 9/1959 | Manly | 126/440 |
| 3,088,882 | 5/1963 | Justice | 202/234 |
| 3,104,210 | 9/1963 | Mount | 203/DIG. 1 |
| 3,190,816 | 6/1965 | Ademac | 202/234 |
| 3,192,133 | 6/1965 | Ademac | 202/234 |
| 3,317,406 | 5/1967 | Beard | 202/180 |
| 3,330,740 | 7/1967 | Duffy | 202/180 |
| 3,886,998 | 6/1975 | Rowekamp | 165/2 |
| 3,986,936 | 10/1976 | Rush | 202/234 |
| 4,022,186 | 5/1977 | Nothrup | 350/211 |
| 4,134,393 | 1/1979 | Stark et al. | 203/DIG. 1 |

FOREIGN PATENT DOCUMENTS 53-10031  4/1978  Japan .......................... 202/234

*Primary Examiner*—Wilbur L. Bascomb, Jr.
*Attorney, Agent, or Firm*—Kenyon and Kenyon

[57] ABSTRACT

Solar distillation apparatus are disclosed in which a substantial part of the heat of condensation of the condensing liquid is recovered. A conduit having an inclined smooth lower surface is disposed above the liquid to be distilled and on which the evaporated liquid condenses and releases its heat of condensation. A fluid is circulated through the conduit in a heat exchanging relationship with the lower surface thereof, the fluid absorbing a substantial part of the released heat of condensation. The condensed liquid flows along the bottom of the inclined lower surface and is discharged from the lower end thereof and collected. The conduit in the preferred embodiments is flat and transparent and the spacing between the upper and lower walls of the conduit is selected so that only a small part of the solar energy is absorbed in the conduit while the fluid in the conduit recovers a substantial part of the released heat of condensation. In accordance with the invention, more fluid is circulated in the conduit means than the quantity of liquid evaporated from the distillation compartments and condensed on the conduit means in order to carry away the released heat of condensation while maintaining the temperature of the fluid below that of the condensing liquid vapor. In accordance with the preferred embodiments, salt water is distilled and the quantity of fluid circulated through the conduit to absorb and carry the heat of condensation released by the condensing water vapor, will greatly exceed, for example, by 10 times, the quantity of condensed water evaporated, and distilled by the apparatus. Much more fluid is circulated in the conduit to maintain the fluid temperature below that of the condensing water vapor. The concentrated brine at for instance 80° C. may be recycled one or several times in separate distillation units or in distillation channels or compartments of the same unit wherein brine instead of preheated water to be distilled is introduced into the distillation compartments. Thus, the heat of the brine may be recovered and the concentration of the brine may be increased in successive compartments and units, allowing a more economical extraction of salts from the brine. A separate heat exchanger using a fluid heated for instance to 150° C. by solar energy in a separate solar energy unit can be used to preheat the water to be distilled, increasing its temperature to for instance 75° C. before introducing the water into the distillation compartment. The production of distilled water according to the invention is substantially higher than by conventional solar ponds and the cost of producing distilled water reduced to zero in certain locations when credit is obtained for the salts extracted from the concentrated brine. Preferably, the bottoms of the distillation compartments are blackened by a water-proof flexible material such as Esso Butyl or a similar material.

31 Claims, 9 Drawing Figures

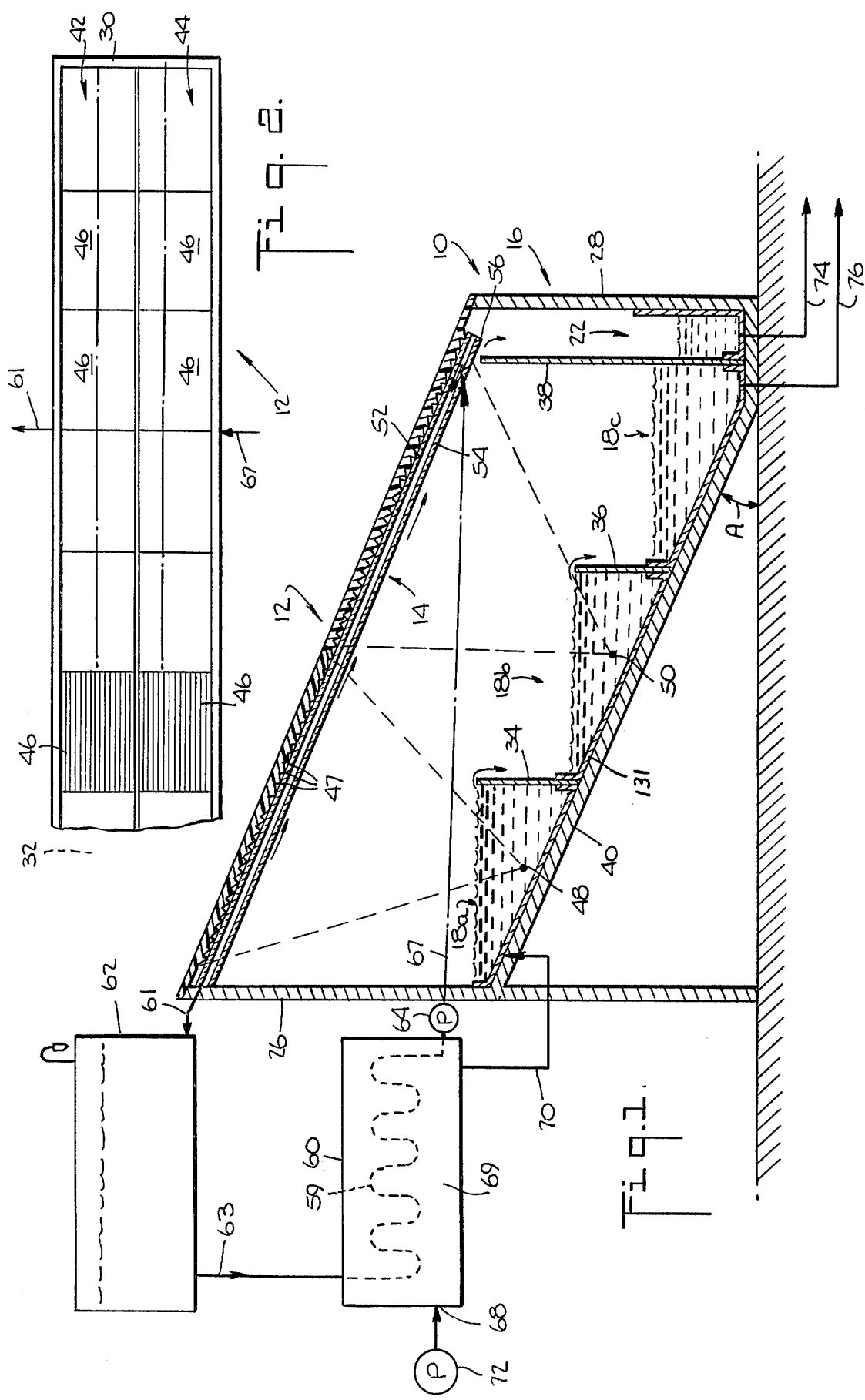

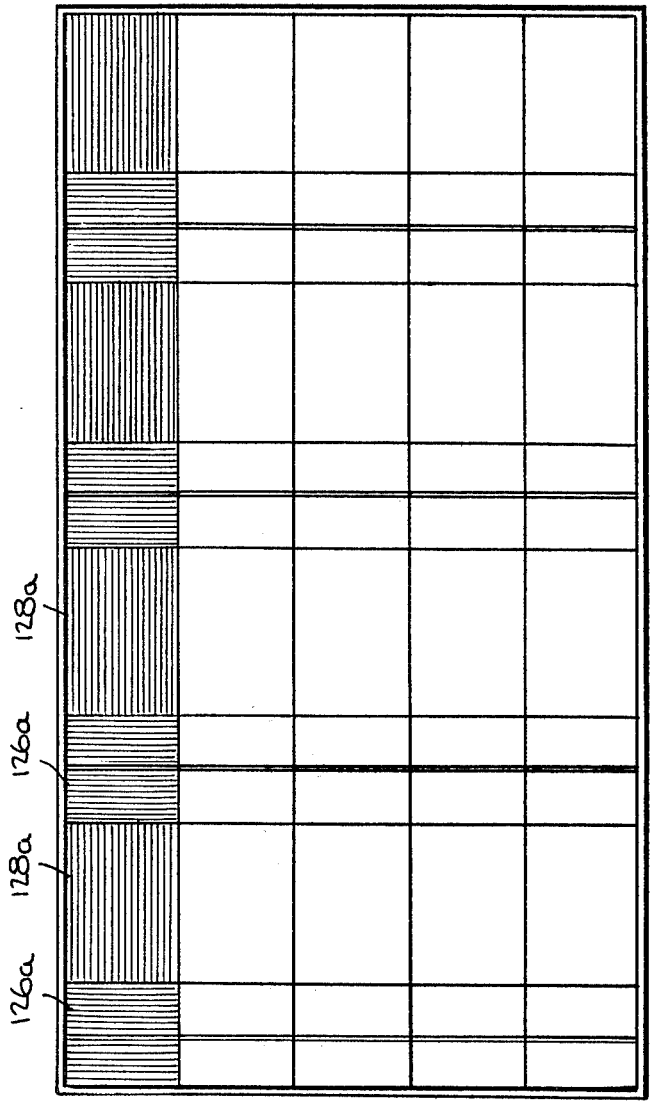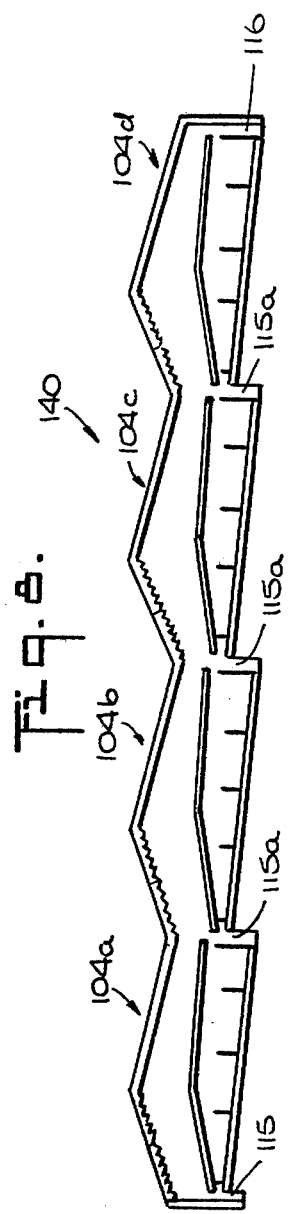

SOLAR DISTILLATION APPARATUS

BACKGROUND OF THE INVENTION

The present invention relates to solar distillation apparatus and more particularly to apparatus for the solar distillation of water.

In pending Application Ser. No. 746,065 filed Nov. 30, 1976, on which U.S. Pat. No. 4,134,393 issued on Jan. 16, 1979, of which I am co-inventor and the sole assignee, and in pending Application Ser. Nos. 807,513 filed June 20, 1977 and 845,862 filed Oct. 31, 1977, now U.S. Pat. No. 4,194,949, of which I am sole inventor, solar energy distillation apparatus are disclosed in which a part of the heat of condensation of the condensing liquid is recovered. In the disclosed embodiments in those applications, the heat of condensation is transferred to a fluid in a fluid lens. The fluid lens is disposed over the liquid to be distilled and is inclined to provide an inclined bottom surface on which the evaporated liquid is condensed and along which the condensate may flow to be discharged from the lower end thereof. However, in order to provide a suitable flow and discharge of condensate along the bottom surface of the fluid lens the inclination of the fluid lens should preferably be between about 10° to about 20°.

The lens is also inclined to increase collection of solar energy and in some locations, however, an inclination of up to about 45° is desirable. At locations where a lens inclination of greater than 20° is desirable to increase collection, the system operates at reduced efficiency since the fluid lens is limited to angles of inclination of less than about 20°. For example, at a latitude of 35° S., the optimum angle of inclination for the lens will be about 45° and a system with a lens inclined at about 20° will collect less solar energy than a system with a lens inclined at the optimm angle of 45°.

Additionally, the focal distance and concentration of fluid lenses suitable for use in solar distillation apparatus are competing factors. A large fluid lens is desirable to provide a high concentration factor but the focal distance of the fluid lens increases with its aperture. Therefore, a compromise must be reached between the concentration factor and focal distance of the fluid lens in which the concentration factor of the lens may not be as high as desired in order to reduce the focal distance of the lens, and the focal distance may be longer than desired to increase the concentration factor of the lens. Moreover, since the fluid lens must be placed at a greater distance from the liquid than otherwise desired in order to increase its concentration, there is a large volume, which is undesirable, between the lens and the liquid to be distilled.

The spacing between the lens plates of the fluid lens is determined by the lens characteristics desired and the lens fluid used. The greater the spacing of the lens plates, the lower the transmission efficiency of the lens. For example, with a lens plate spacing of only about two inches at the center of a lens having a convex upper plate and a flat lower plate, there are important transmission losses through the lens. Transmission efficiency through the fluid lens is also dependent upon the particular lens fluid chosen. For example, when distilling salt water, salt water may be chosen as the lens fluid and circulated through the lens to preheat the water. However, there are also important transmission losses through the salt water. Additionally, when salt water is used as the lens fluid, deposits of salt and minerals will accumulate within the lens requiring cleaning thereof.

In accordance with the present invention, these drawbacks are substantially overcome and improved solar energy distillation apparatus are provided.

SUMMARY OF THE INVENTION

It is an object of the present invention to provide solar energy distillation apparatus of improved efficiency in which a substantial part of the heat of condensation of the condensed, distilled liquid is recovered.

It is another object of the present invention to provide solar energy distillation apparatus of improved efficiency in which a substantial part of the heat of condensation of the condensed, distilled liquid is recovered and an increased amount of solar energy collected.

These and other objects of the present invention are accomplished by providing solar distillation apparatus in which the solar energy is concentrated in the liquid to be distilled and conduit means including a heat exchange fluid therein are provided to condense the evaporated liquid vapor on a surface thereof, the conduit means being disposed intermediate the liquid to be distilled and means for concentrating the solar energy in the liquid.

In accordance with the invention, the apparatus comprises lens means disposed above the liquid to be distilled for concentrating the solar energy therein; conduit means for passing a fluid therethrough disposed intermediate the lens means and the liquid to be distilled and comprising an inclined, lower wall having a smooth outer surface and having a lower end; a fluid in said conduit means in a heat exchanging relationship with said lower wall; and container means disposed below said lower end for receiving condensed liquid. The concentrated solar energy causes the liquid to evaporate with the vapor impinging and being condensed upon the outer surface of the lower wall, the condensed liquid flowing along the outer surface of the lower wall to the lower end thereof and falling therefrom into the container means, a substantial part of the heat of condensation of the condensing vapor being absorbed by the fluid in the conduit means.

The conduit means is transparent at least in part and the solar energy is passed through the transparent portions into the liquid to be distilled, the conduit means and the lens means being superposed at least in part.

In the disclosed embodiments, the conduit means is a flat conduit comprised of transparent upper and lower walls sealingly joined, for example welded, to form the conduit.

According to one embodiment of the invention, a plurality of sets or series of Fresnel-type lenses are arranged over a container holding liquid to be distilled. Each set of Fresnel lenses includes a plurality of individual Fresnel lenses arranged end to end to provide an elongated narrow focus. The series of Fresnel lenses are inclined with respect to the horizontal. The container includes a plurality of baffles dividing the container interior into a plurality of distillation compartments for the liquid to be distilled. The container bottom is inclined in the same direction of the Fresnel lenses so that the compartments are offset in height. The elongated focus of each series of Fresnel lenses may therefore be located in and along a different compartment.

Interposed between the Fresnel lenses and the distillation compartments is a flat plate conduit containing a heat exchange fluid. The flat plate conduit is inclined at approximately 5 to 20 degrees with the horizontal and located above the compartments so that evaporated vapor is condensed on the lower surface of the conduit. The container also includes a collection compartment for the condensate disposed adjacent the lower side thereof which is disposed below the lower end of the flat plate conduit. The condensate flows along the lower plate of the conduit to the lower end and is discharged therefrom into the compartment.

An expansion tank for the heat exchange fluid in the conduit is located so as to provide minimal pressure within the conduit.

A heat exchanger is also provided to transfer the heat recovered in the heat exchange fluid circulated in the conduit to the liquid being introduced into the container to preheat the liquid. The heat exchanger is also located to minimize pressure in the conduit. Another solar energy system may be utilized to further preheat the liquid to be distilled, for instance to 75° C. in the case of water, before the liquid is introduced into the container.

In accordance with the invention, more fluid is circulated in the conduit means than the quantity of liquid introduced into the distillation compartments, evaporated therefrom and condensed on the conduit means in order to carry away the released heat of condensation while maintaining the temperature of the fluid below that of the condensing liquid vapor.

In the case of the distillation of salt water, the quantity of fluid circulated through the conduit to absorb and carry the heat of condensation released by the condensing water vapor, will greatly exceed, for example, by 10 times, the quantity of water evaporated, condensed and distilled by the apparatus. Much more fluid is circulated in the conduit to maintain the fluid temperature below that of the condensing water vapor.

The liquid concentrated with impuities (in the case of salt water, concentrated brine at for instance, 80° C.) may be recycled one or several times in separate distillation units or in the distillation channels or compartments of the same unit, the liquid concentrated with impurities (or the brine) being introduced into the distillation compartments to take the place of at least some of the liquid to be distilled which would otherwise be introduced into the compartments. Thus, the heat of the liquid concentrated with impurities (brine) may be recovered and the concentration of thereof may be increased in successive compartments and units, allowing a more economical extraction of, for example, salts from the brine.

A separate heat exchanger using a fluid heated, for instance, to 150° C. by solar energy in a separate solar energy unit can be used to preheat the liquid to be distilled, increasing its temperature, in the case of water to, for instance, 75° C., before introducing the liquid into the distillation compartment.

In accordance with another embodiment of the invention, the sets of Fresnel lenses are arranged so that the elongated focus of at least one set is substantially parallel to the axes of the compartments in the container and the elongated focus of at least one other set is arranged so that the elongated focus is transverse to the axes of the compartments. According to this embodiment, the focus which is transverse to the axis of the compartments extends into varying depths of liquid in the container. The two sets of Fresnel lenses are arranged at an angle to each other so that they meet along an apex with each set having a lower end. The conduit system on which vapor condenses is made up of two flat plate conduits disposed at an angle along an apex with each conduit having a lower end disposed above compartments for the distilled liquid.

In still another embodiment of the invention, a composite system is provided made of of individual, adjacently arranged units.

The Fresnel lenses may be replaced by fluid lenses, if desired. However, the Fresnel lenses are preferred for the reasons discussed above.

According to the present invention, production of distilled water from salt water is substantially higher than by conventional solar ponds. The cost of producing distilled water may be reduced to zero in certain locations when salt (NaCl) and/or magnesium chloride sulfate are extracted from the concentrated brine.

According to another asepect of the invention, the bottom of the compartment containing the liquid to be distilled is blackened preferably by flexible blackened material which is impermeable to the liquid. In the case of water, Esso Butyl or a similar material may be used. This allows absorption of solar energy and enhances the heating of the liquid, and also seals the bottom of the compartment. Alternatively, the compartment bottom can be the ground surface covered by the material instead of concrete, for example.

According to another aspect of the invention involving distillation of salt water, a chemical such as barilium chloride may be added to the salt water to prevent the formation of otherwise insoluble deposits such as calcium sulfate or unstable sodium bicarbonates which may form in the salt water. Barilium sulfate may deposit during the nights, for example, and can be extracted and sold for use in the pretroleum industry for drilling oil wells.

These and other aspects of the present invention will be more apparent from the following description of the preferred embodiments thereof when considered with the accompanying drawings.

BRIEF DESCRIPTION OF THE DRAWINGS

The present invention is illustrated by way of example and not limitation in figures of the accompanying drawings in which like references indicate similar parts and in which:

FIG. 1 is a vertical cross-section schematic view of solar distillation apparatus according to the invention showing two adjacent sets of Fresnel lenses arranged above a container holding water to be distilled, a transparent plate-like conduit on which vapor is condensed being interposed between the container and the lenses, the plate-like conduit and the lenses being inclined at about the same angle to be substantially parallel;

FIG. 2 is a top plan schematic view, partly broken-away, of the solar distillation apparatus of FIG. 1;

FIG. 8 is a vertical cross-section schematic view of a composite solar distillation apparatus utilizing a plurality of systems of the type shown in FIGS. 6-7; and FIG. 9 is a top plan schematic view of the composite system of FIG. 8.

DESCRIPTION OF THE PREFERRED EMBODIMENTS

Figure 3:
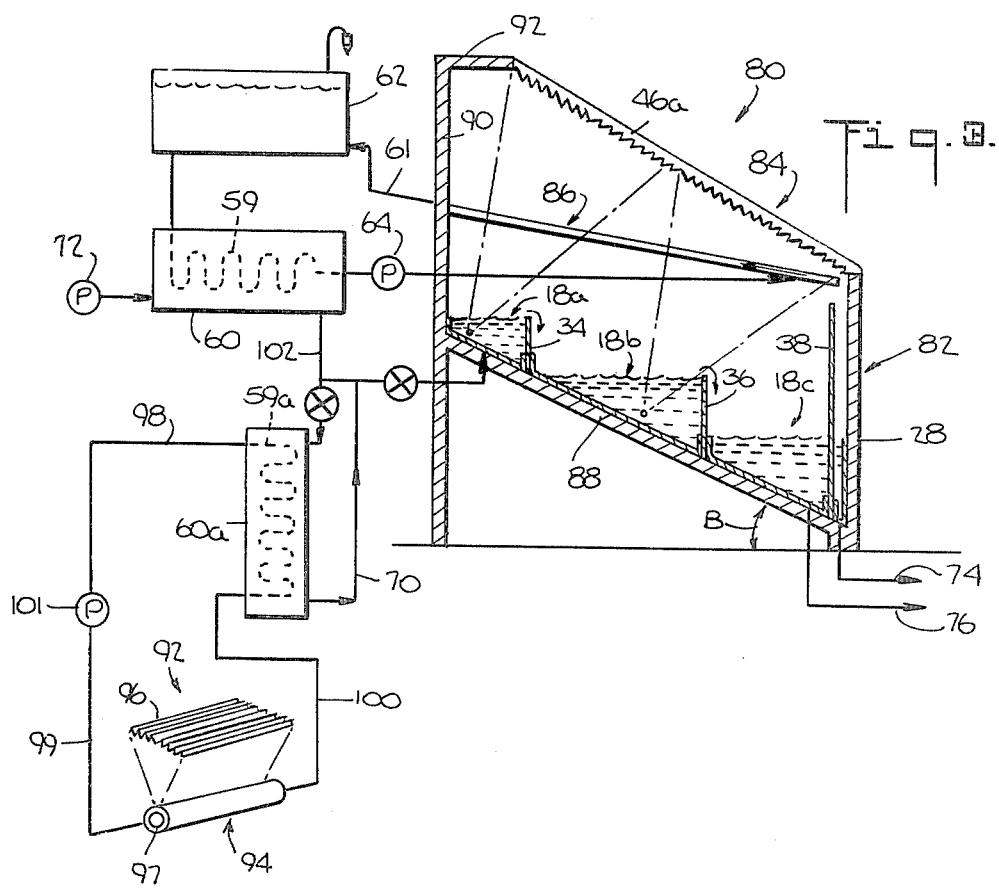
FIG. 3 is a vertical cross-section schematic view of solar distillation apparatus according to the invention similar to that shown in FIG. 1 with the Fresnel lenses being inclined at a greater angle than the plate-like conduit.

Referring more particularly to the drawings, apparatus for the solar distillation of water are illustrated. In FIG. 1, the distillation apparatus 10 includes a Fresnel lens system 12 to concentrate the solar energy, a transparent flat plate conduit 14 on the bottom of which water vapor is condensed, and a container 16 having compartments 18a,b,c for the water to be distilled and a compartment 22 for distilled water which is discharged from the bottom of the conduit 14. The sides 26, 28 of the container are offset in height and the lens system 12 extends inclined along the sides of the container between the ends 30, 32 thereof, the lens system closing the top of the container and being supported by the sides and ends of the container. Compartment 18a in the container is formed by the side 26 of the container, a baffle 34 and the ends of the container; compartment 18b by baffles 34 and 36 and the ends of the container, and compartment 18c by baffle 36, partition 38 and the ends of the container. The partition 38 separates the compartments 18a,b,c holding water to be distilled from compartment 22 holding the distilled water. Compartments 18a,b,c extend parallel to the elongated axis of the container.

The bottom 40 of the container is inclined downwardly from side 26 to side 28 at an angle A with respect to the horizontal. The heights of baffles 34 and 36 are substantially equal to provide the inclined container bottom 40 with stepped compartments 18a,b,c so that during normal distillation operation, the maximum depths of the water to be distilled in compartments 18a,b,c are substantilly equal. The water to be distilled is introduced into compartment 18a and overflows therefrom into the othe compartments. The height of partition 38 is higher than the heights of baffles 34, 36 so that the water to be distilled does not flow into compartment 22. Since compartment 18a is separated from the other compartments, the introduction therein of the water to be distilled does not directly cool the heated water in the other compartments.

The lens system 12 is inclined downwardly, extending from the higher side 26 to the lower side 28 of the container substantially parallel to the container bottom 40 at approximately the angle A with the horizontal. The lens system 12 includes two series 42, 44 of adjacently disposed Fresnel lenses 46, each series extending substantially parallel to the elongated axes of the container and compartments 18a,b,c. The inclined, parallel lenses are spaced by, for example, one inch to preventing shadowing of adjacent lenses. Two series of lenses are shown and each series of lenses is shown to include six lenses; however, one or three or more series of lenses and more or less than six lenses may be utilized per series depending upon the size of the installation and the quantity of distilled water desired. Each Fresnel lens comprises longitudinally extending prisms 47 which provide an elongated narrow focus. The series of lenses are arranged to provide spaced parallel elongated composite foci 48, 50. The composite focus 48 of lens series 42 is located in the water in compartment 18a while the composite focus 50 of lens series 44 is located in the water in compartment 18b, each focus extending substantially parallel to the elongated axis of the respective compartment. Offsetting the height of the compartments, i.e. providing an inclined lower surface of the container and spaced baffles, permits the foci of the inclined lens system to be located in the different compartments.

Interposed between the lens system 12 and the top of the container is the transparent flat plate conduit 14. Conduit 14 is inclined downwardly from side 26 substantially parallel to the inclination of the lens system, i.e. at approximately angle A, and includes spaced opposed transparent plates 52, 54 which extend downwardly from side 26 to above the compartment 22 for the distilled water. The flat plate conduit 14 is substantially co-extensive with the lens system and extends between ends 30 and 32 and from side 26 downwardly, terminating short of side 28 of the container. The flat plate conduit and the Fresnel lenses are disposed to have a minimal air space therebetween to reduce transmission losses through the lenses and conduits and to reduce heat losses. In the embodiment shown in FIGS. 1 and 2, angle A has a maximum value of about 20°.

the transparent plates 52, 54 are made for example of glass or plastic and are sealed along the peripheries thereof to be fluid-tight and thusly form the conduit 14. The plates may be sealed at their peripheries by, for example, welding or with a sealant such as silicone. A frame may be provided in which the edges of the plates are mounted fluid-tight using, for example, a silicone sealant. The plates 52, 54 are planar or flat, as mentioned, and are parallel, being spaced by a distance of from about 6 mm to about 12 mm. Openings are provided to the interior of conduit 14 to permit the evacuation of air therefrom and for the circulation of a fluid through the conduit 14. The lower plate 54 forms a vapor barrier over the container.

The plates forming the conduit 14 may alternatively be co-extensive in lenght and width with each Fresnel lens series or each lens, with the plates being adjacently disposed and sealed and the lower surfaces of adjacently sealed plates forming a vapor barrier over compartments 18a,b,c to prevent escape of vapor therepast. A frame and/or a sealant may be used to sealingly join adjacent plates.

The lower end 56 of the conduit is supported by frame means and is spaced from the top of partition 38 to provide the only opening through which vapor may pass from the compartments. However, the spacing is small and the escape of vapor therethrough is negligble. Water vapor evaporated from compartments 18a,b,c rises and impinges upon the bottom of the conduit 14 and condenses thereon. The condensate flows downwardly past the opening between the partition 38 and the conduit towards end 56 of the conduit and is discharged therefrom into compartment 22 for the distilled water. Thus, the opening between the partition 38 and the bottom surface of the conduit need only be large enough to permit the condensate to flow therepast.

As mentioned, the plates are mounted fluid-tightly to form conduit 14 with the lower surface of the conduit forming a vapor barrier. The plates are thus mounted to form a fluid-tight, elongated, generally rectangular enclosure through which a heat exchange fluid may be circulated. As mentioned, water vapor impinges upon the bottom of the conduit and is condensed thereupon. Upon condensation of the water vapor, the heat of condensation thereof is released and heats the bottom plate or plates of the conduit. The bottom plate or plates are also heated by the sensible heat of the vapor and condensate. A heat exchange fluid is circulated through the conduit to recover a substantial part of the heat of condensation and the sensible heat and to cool the bottom plate(s) of the conduit to enhance condensation thereon.

The interior of the conduit 14 is connected to the coil 59 of a heat exchanger 60 by conduits so that the heat exchange fluid may be circulated through the conduit 14 and the heat exchanger 60. An expansion tank 62 for the heat exchange fluid is provided between the conduit 14 and the coil of the heat exchanger, conduit 61 connecting conduit 14 to the reservoir. The expansion tank is located at approximately the same height as the conduit 14 to minimize pressure in the conduit. Preferably, the heat exchanger is located within about 50 cm vertically from the expansion tank to provide a small height difference in the levels of the heat exchange fluid, thereby requiring a low pressure to circulate the fluid. Angle A may be changed to further reduce the pressure required to circulate the fluid. Thus, the conduit need not withstand high pressures. The heat exchange fluid may be circulated by pump 64 about a closed circuit which passes through the conduit 14, conduit 61, the expansion tank, conduit 63 the coil 59 of the heat exchanger and conduit 67. Water to be distilled is introduced through inlet 68 into a chamber 69 in the interior of the heat exchanger so that the water in the chamber and the fluid in the coil are in a heat exchanging relationship. The chamber is connected to compartment 18a by conduit 70. Thus, the water to be distilled may be pumped by pump 72 through the heat exchanger and discharged into compartment 18a of the container. Conduits 61 and 67 have been shown to include only one conduit each. However, it is understood that each may comprise more than one conduit depending upon the size of conduit 14 and the quantity of fluid circulated therethrough.

In operation, solar energy is concentrated by lens series 42, 44 in elongated foci 48, 50 located in the water in compartments 18a, 18b respectively. Water is introduced into the container in compartment 18a and upon overflowing baffle 34, enters compartment 18b; upon overflowing baffle 36, the water enters compartment 18c. As the water moves from compartment 18a to compartment 18c, it is progressively heated in compartments 18a and 18b by the concentrated solar energy and a substantial portion thereof is evaporated. Since the water overflowing into compartment 18b has been heated in compartment 18a by the solar energy concentrated along focus 50, the water in compartment 18b will reach a higher temperature than the water in compartment 18a so that evaporation from compartment 18b in the central part of the container is accelerated. Heater water overflows into compartment 18c from compartment 18b with evaporation continuing. The water vapor rises and impinges upon the bottom plates of the conduit and is condensed thereon. The condensate flows donwardly along the bottom plates and is discharged into compartment 22. Distilled water is removed from compartment 22 through conduit 74. The water in compartment 18c is a concentrated brine also containing other minerals such as magnesium chloride and magnesium sulfate and is removed through conduit 76.

A clear heat exchange fluid is circulated through the flat plate conduit, as mentioned, to recover a substantial part of the heat of condensation of the condensing liquid and to cool the bottom plates of the flat plate conduit to enhcance condensation. The heat exchange fluid is circulated through the heat exchanger and the heat removed from the heat exchange fluid is transferred to the incoming water to be distilled to preheat it. Thus, a substantial portion of the heat of condensation is recovered and used to increase the efficiency of the system.

The heat exchange fluid circulated in the conduit may be Therminol 66, a clear liquid available from Monsanto, or a similar liquid, or distilled water which may have a product such as glycol added thereto to raise the boiling point of the distilled water and lower its freezing point.

According to the invention, the flat plate conduit is used to condense the water vapor and accordingly the plates thereof are spaced and the heat exchange fluid therein is chosen to permit maximum transmission of solar energy therethrough while accomplishing condensation of the water vapor and recovery of a substantial part of the heat of condensation. The fluid circulating in conduit 14 is also heated by the absorption of solar energy transmitted through the Fresnel lenses and from solar energy reflected to the fluid in the conduit from the water in the container.

In the embodiment shown in FIGS. 1 and 2, the Fresnel lenses 46 can, for example, be about 84 cm wide by about 250 cm long and have a concentration factor of about 40 and a focal width of about 2 cm; the container can, for example, be about 168 cm wide by about 125 cm long and the height of baffles 34 and 36 can, for example, be about 50 cm. The width of the compartments can, for example, be about 40 cm. The water depth in the compartments can correspondingly be about 5 cm to about 50 cm, which is relatively shallow. The apparatus 10 is arranged with its longitudinal axis in the east-west direction and the lens system facing South. Preferably, the bottoms of the compartments are blackened by a flexible dark sheet 131 such as Esso Butyl or a similar material which is also water tight and is capable of withstanding temperatures of up to 100° C. and will absorb heat and transfer it to the water to be distilled to increase the temperature thereof. This will allow use of levelled earth instead of concrete for the bottom of the channel, thereby reducing the cost of the installation. The temperature of the water introduced into compartment 18a is about 55° C. and can gradually reach about 85° C. therein.

The quantity of fluid circulated in the flat panel conduit 14 is much larger, for instance, by 10 times, than the quantity of distilled water obtained through evaporation and condensation of vapor on the conduit. This large quantity of fluid is required to carry off the recuperated heat of condensation while maintaining the temperature of the fluid below that of the condensing vapor. Thus, condensation of the water vapor continues on the bottom plate of conduit 14.

Figure 4:
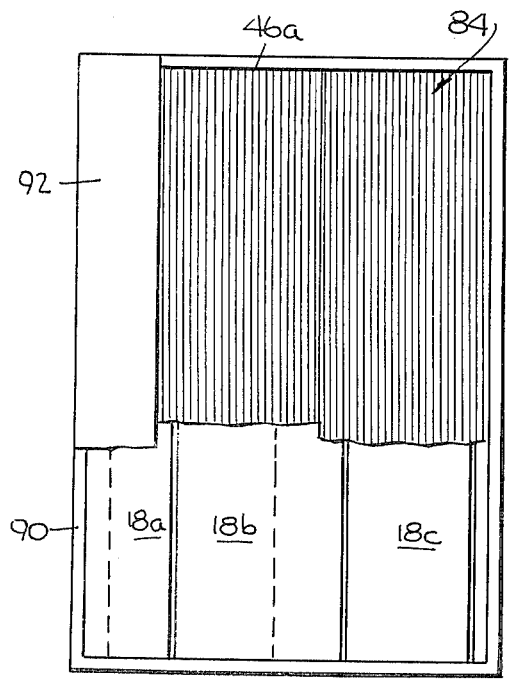
FIG. 4 is a top plan view, partly broken-away, of the solar distillation apparatus of FIG. 3.
Figure 5:
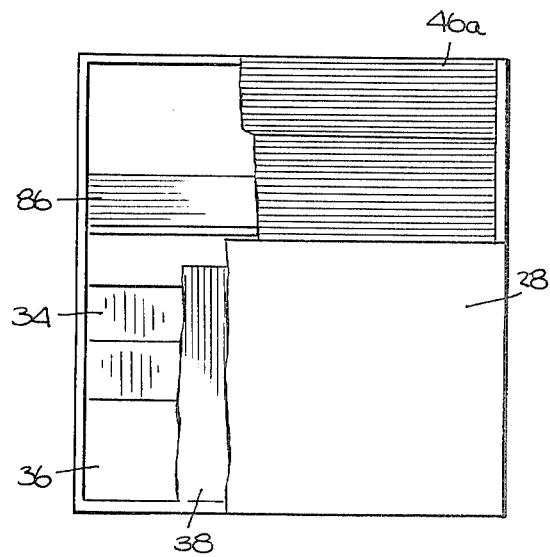
FIG. 5 is an end elevation schematic view, partly broken-away, of the solar distillation apparatus of FIG. 3.

Referring now to FIGS. 3-5, the solar distillation apparatus 80 includes a container 82, a Fresnel lens system 84 and a transparent flat plate conduit 86 similar to that shown in FIGS. 1 and 2 and described above. The container bottom 88 and the Fresnel lens system 84 are each approximately inclined at an angle B with the horizontal while the transparent flat panel conduit is inclined at the angle A, as in FIGS. 1 and 2. Angle B is in the range of from about 25° to about 60°. The higher side 90 of the container includes a shoulder 92 to support the Fresnel lens system and space it from side 90 so that the focus of lens 46a is located in compartment 18a, as in FIGS. 1-2. The transparent flat plate conduit is spaced from the lens system since the lens system and flat plate conduit are inclined at different angles with the horizontal, the lens system and flat plate conduit being inclined with respect to each other at an angle of B-A. The lens system and conduit are therefore separated. The baffles 34 and 36 are of unequal height, baffle 36 being higher than baffle 34 to provide a greater depth of water in compartment 18b.

Apparatus 80 also includes a separate solar heater 92 which is illustrated to be of the type disclosed in U.S. Pat. No. 4,134,393 which is hereby incorporated by reference. The collector 94 of heater 93 includes two conduits carrying fluids therein heated by solar energy concentrated by lens system 96. The coil 59a of heat exchanger 60a is connected to one of the conduits, preferably the outer conduit 97 and a heat exchange fluid is circulated through the outer conduit and coil 59a. Conduits 98-100 complete the circuit with the fluid being pumped by pump 101. Conduit 102 connects the chambers of the two heat exchangers, and conduit 70 connects the chamber of exchanger 60a to compartment 18a. Heater 92 is used to assist in preheating the water to be distilled which is introduced into compartment 18a of apparatus 80. The water to be distilled passes first through heat exchanger 60 as described for FIG. 1, and then through heat exchanger 60a before being introduced into compartment 18a through conduit 70.

Apparatus 80 operates similar to apparatus 10 and provides additional heat from heater 92 to preheat the water introduced into container 82. Additionally, the lens system is inclined at an optimum angle towards the south to collect additional solar energy. A fluid as described for conduit 14 of FIG. 1 is circulated through heater 92 and can be heated to about 280° C. The heat exchanger 60 transfers heat recovered by the fluid in conduit 14 to the water to be distilled. In apparatus 80, the water is preheated and introduced into compartment 18a at a temperature which can reach about 75° C.

Other details of apparatus 80 are similar to apparatus 10. Only two Fresnel lenses have been shown for apparatus 80 for clarity, but it is understood that the lens system may comprise series of lenses as for apparatus 10.

Figure 6:
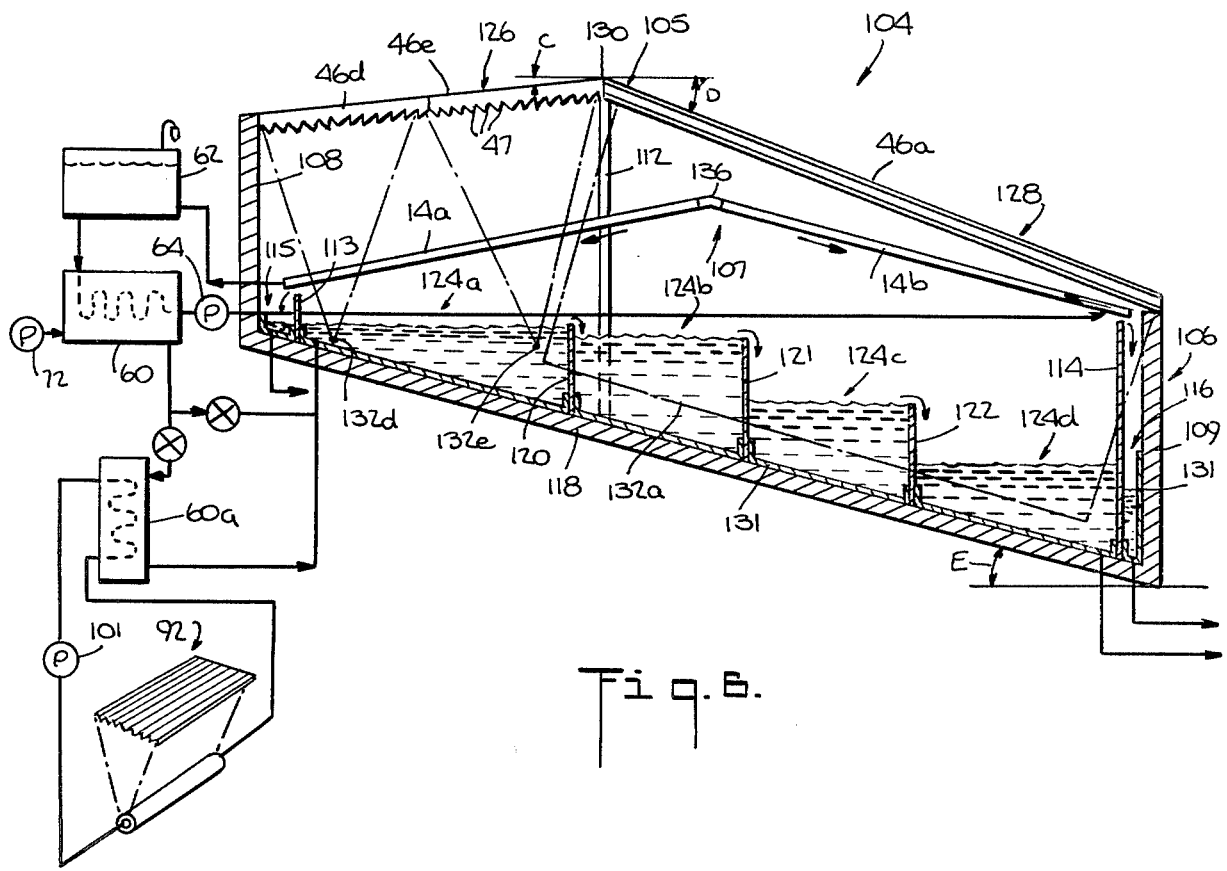
FIG. 6 is a vertical cross-section schematic view of solar distillation apparatus according to still another embodiment of the invention showing two sets of Fresnel lenses arranged above the container for the water to be distilled with an inclined transparent plate-like conduit on which vapor is condensed interposed between the lenses and the container, one set of lenses extending generally parallel to the axis of container and one set of lenses extending transverse to the container axis, the two sets of lenses being adjacent and inclined with respect to each other and with respect to the container and plate-like conduit.
Figure 7:
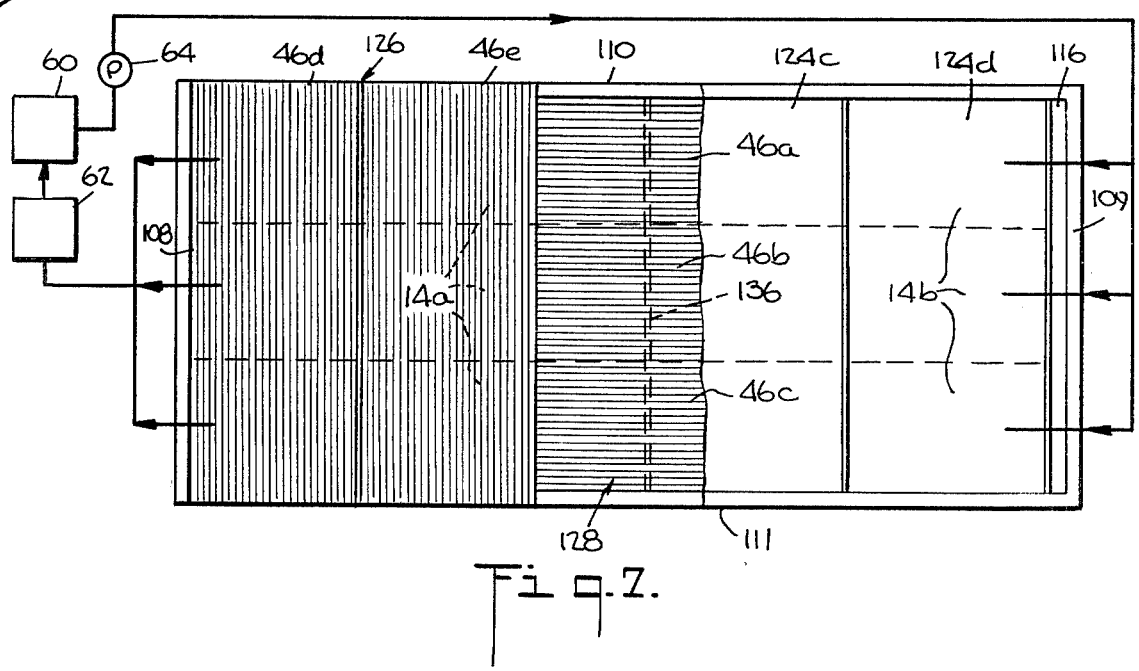
FIG. 7 is a top plan schematic view of the solar distillation apparatus of FIG. 5.

In FIGS. 6-7, solar distillation apparatus 104 includes a lens system 105, container 106 and a flat-plate transparent conduit system 107. Container 106 includes sides 108, 109 and ends 110, 111 which with support 112 support the lens system 105. The container 106 comprises partitions 113, 114 disposed in the container adjacent walls 108, 109 to form compartments 115, 116 for the distilled water. Each compartment is formed by the bottom 118, sides and portions of the ends of the containers and the partitions. Baffles 120-122 are also provided in container 106 extending substantially parallel to the partitions to form with partitions 113 and 114 and portions of the container ends, compartments 124a,b,c,d for the water to be distilled. The heights of the baffles 120-122 are less than the heights of the partitions 113, 114 so that the water to be distilled will not overflow into compartments 115, 116 during normal distillation operation.

The lens system 105 includes lens series 126 and 128 of Fresnel lenses 46. The lenses of series 126 are arranged with their longitudinal axes and the axes of the refracting prisms 47 extending parallel to the longitudinal axes of the compartments. The lenses of series 128 are arranged with their longitudinal axes and with the axes of the refracting prisms 47 of the lenses extending substantially transversely to the longitudinal axes of the compartments. Lens series 126 and 128 are inclined with respect to each other with the two lens series meeting over the container and forming an apex 130 thereabove. Lens series 126 extends from apex 130 downwardly at an angle C with the horizontal and is supported by side 108 of the container. Lens series 128 extends from apex 130 downwardly at an angle D with the horizontal and is supported on side 109 of the container. Support 112 extending at the apex supports the lens system thereat. Side 108 is higher than side 109 and the apex 130 is located closer to side 108 than side 109. Therefore, angle D is greater than angle C. The bottom 118 of the container is inclined at an angle E with the horizontal, the water to be distilled being introduced into compartment 124a and overflowing into compartments 124b-d. Concentrated brine is removed from compartment 124d.

Each of lenses 46a,b,c of lens series 128 has an elongated focus 132a,b,c extending transverse to the axes of the compartments (FIG. 6) and extending through varying depths of water. Each of lenses 46d,e has an elongated focus 132d,e extending within compartment 124a with the axes of foci 132d,e extending substantially parallel to the axis of compartment 124a, each focus extending through a substantially constant water depth with the two foci being at different water depths.

The transparent conduit system 107 includes transparent conduits 14a, 14b inclined with respect to each other along apex 136, each extending downwardly at the angle A, as described for FIGS. 1-5, towards sides 108 and 109, respectively. Supports suspend the transparent conduits above the container with the lowermost ends of the conduits being above compartments 115, 116. Each conduit lower surface forms a vapor barrier as described for conduit 14 in FIGS. 1-5 and the lower surface of the apex is sealed fluid-tight so that the conduit system 107 forms a vapor barrier above the container. The circuit for the fluid in the conduits 14a and 14b passes serially through the conduits and the heat exchanger 60. The water to be distilled passes serially through heat exchanger 60 and heat exchanger 60a. The angles of inclination of the lens series exceeds angle A and there is a space between the conduit system and the lens system, as described for FIGS. 3-5.

Apparatus 104 also includes the heat exchanger 60a and the solar heater 92, as described for FIGS. 3-5. Moreover, two conduits 14a, 14b are provided and two compartments for the distilled water are provided to increase the production of distilled water.

Apparatus 104 is arranged so that the compartments extend generally east-west and operates similar to apparatus 10 and 80. Apparatus 104 includes the intersecting lens foci which serve to heat the water at different depths transverse to the axis of the compartments as well as substantially parallel to the axes of the compartments. Additionally, the lens system 105 includes lens series which can be tilted to the north and to the south at, for example, 10° and 30°, respectively to collect more solar energy than the apparatus of FIGS. 1–5. The temperature of the water in compartments 124a-d can gradually reach about 85° C.

While the lens series 126, 128 have been shown to include three and two Fresnel lenses, respectively, it is understood that each series may comprise more or less lenses having the same or different sizes so that the lens system extends over substantially the entire top of the container.

Although not shown, means may be provided to move the lens systems to track the sun to further increase production of distilled water.

Mirrors may be disposed along selected portions of the prisms of the Fresnel lenses to further concentrate the solar energy in the liquid to be distilled.

Excess water vapor not condensed in the distillation apparatus may be removed and superheated in a heat exchanger using a heater such as solar heater 92. The superheated steam at 250° C. for example, can be expanded in a turbine to obtain power and condensed to obtain additional distilled water.

Referring now to FIGS. 8 and 9, a composite distillation system 140 is shown which comprises a plurality of individual, adjacently arranged systems 104a-104d. Each system 104a-104d is similar to system 104 with adjacent systems having common compartments 115a for receiving distilled water. Each system 104a-104d is individually supplied with water to be distilled and heat exchange fluid for circulating in the conduit system of each system 104a-104d. Common conduits, however, may be used to supply and withdraw the water and fluid.

The brine which is a high temperature and at a higher concentration than the water (salt water) to be distilled, can be serially fed to one or more successive distillation units. Moreover, a countercurrent arrangement may be set up within a single unit or among several units in which the concentrated brine of downstream compartments is supplied to the upstream compartments. Thus, the heat in the brine at about 80° C., for instance, can be recuperated and used to enhance evaporation of water in other compartments or units. Additionally, the brine will be concentrated and allow a more economic extraction of salt and/or other chemicals such as magnesium chloride, magnesium sulfate, etc., therefrom.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purposes of the disclosure without departing from the spirit and scope of the invention. Protection by Letters Patent of this invention in all its aspects as the same are set forth in the appended claims is sought to the broadest extent that the prior art allows.

What is claimed is

1. Apparatus for distilling a liquid such as water using solar energy comprising:

means for containing the liquid to be distilled;

lens means disposed above said containing means for concentrating the solar energy in said liquid to be distilled;

elongated conduit means disposed between said lens means and said containing means for condensing evaporated liquid thereon, said conduit means being transparent at least in part so as to allow solar energy concentrated by said lens means to pass therethrough and reach said containing means, said conduit means including means for admitting fluid to and withdrawing fluid from said conduit means such that a fluid can be passed through said conduit means, said conduit means including a substantially smooth surface disposed above the containing means and positioned such that rising liquid vapor impinges upon said surface and is condensed thereon, said smooth surface being operative to transmit at least in part the heat of condensation released by evaporated liquid condensing thereon to the interior of said conduit means where such heat may be absorbed by the fluid in said conduit means and thereby may be recovered, said smooth surface having a vertically lower portion such that condensed liquid flows along said surface to said vertically lower portion thereof and is discharged therefrom, and liquid collecting means disposed below said lower portion of said smooth surface for collecting condensed liquid discharged from said lower portion.

2. The apparatus as recited in claim 1, wherein said conduit means comprises a planar lower wall which forms said smooth surface.

3. The apparatus as recited in claim 2, wherein said conduit means comprises an upper wall spaced from said lower wall.

4. The apparatus as recited in claim 3, wherein said upper wall is planar.

5. The apparatus as recited in claim 4, wherein said upper and lower walls are parallel.

6. The apparatus as recited in claims 3 or 5 wherein said upper and lower walls are transparent at least in part, said lens means and the transparent portions of the conduit means being disposed so that solar energy concentrated by said lens means passes through the transparent portions into the liquid to be distilled.

7. The apparatus as recited in claim 6, wherein said upper and lower walls are parallel upper and lower transparent flat plates sealingly joined to form a flat conduit, said smooth outer surface being the outer surface of said lower plate.

8. The apparatus as recited in claim 7, wherein said lens means comprises at least one Fresnel-type lens which concentrates the solar energy through said plates in an elongated focus in the liquid to be distilled.

9. The apparatus as recited in claim 8, wherein said conduit means comprises two conduits disposed adjacent each other with the lower surfaces thereof being oppositely inclined, and including an elongated container in which said containing means and said liquid collecting means are disposed, said containing means being disposed centrally in the container and a liquid collecting means being disposed below each said lower end separated by said containing means, said lens means comprising at least two adjacently disposed Fresnel-type lenses, a first of said Fresnel-type lenses being inclined in the direction of one of said conduits and a second of said Fresnel-type lenses being inclined in the direction of the other of said conduits.

10. The apparatus as recited in claim 9, wherein said container includes side and end walls and two partitions therein disposed adjacent opposed side walls thereof, each partition with walls of said container forming a liquid collecting compartment, each of said liquid collecting compartments being disposed below a respective lower end to receive condensed liquid falling therefrom, and wherein said conduits substantially cover said container, and wherein said container includes at least two baffles extending said containing means to separate said container means into at least three compartments for containing liquid to be distilled, an elongated focus of the first Fresnel-type lenses being substantially located in one of said compartments for containing liquid to be distilled and the elongated focus of the second Fresnel-type lens being located at least in part in another of said compartments for containing liquid to be distilled.

11. The apparatus as recited in claim 10, wherein the axis of the first and second Fresnel-type lenses are substantially normal to each other, the elongated focus of the first Fresnel-lens extending through varying depths of liquid in at least said one and another compartments.

12. The apparatus as recited in claim 10, and comprising a plurality of said apparatus adjacently arranged to form a composite apparatus, adjacent apparatus having common compartments for receiving condensed liquid.

13. The apparatus as recited in claim 12, and comprising means for recycling the liquid concentrated with substance in at least one successive apparatus, recycled liquid being introduced into said successive apparatus to replace at least in part liquid to be distilled, whereby part of the heat of the recycled liquid is recuperated and the liquid is further concentrated with substances.

14. The apparatus as recited in claim 7, and comprising a container in which said containing means and said liquid collecting means are adjacently disposed, said container including side and end walls and a partition disposed adjacent one wall of the container, the partition and walls of the container forming a compartment disposed below said lower portion of said lower plate to form said liquid collecting means for collecting condensed liquid falling therefrom, said lower plate substantially covering said containing means and forming a vapor barrier thereabove.

15. The apparatus as recited in claim 4, wherein said container is elongated and said lens means comprise a plurality of elongated Fresnel-type lenses each concentrating the solar energy in an elongated focus in the liquid to be distilled, the elongated axes of said Fresnel-type lenses and said elongated container being substantially parallel.

16. The apparatus as recited in claim 15, wherein said elongated container includes at least one baffle extending in said containing means substantially parallel to the elongated axis of the container to form at least two compartments in said containing means, and wherein the bottom surface of said containing means is inclined in the same direction as the Fresnel-type lenses and the conduit means.

17. The apparatus as recited in claim 16, wherein said elongated container includes a plurality of spaced baffles extending said containing means substantially parallel to the elongated axis of said elongated container dividing said containing means into at least three adjacent compartments which are offset in height, and which define an upper compartment, an intermediate compartment and a lower compartment, said plurality of Fresnel-type lenses being disposed to concentrate solar energy in a first elongated focus located in said intermediate compartment and in a second elongated focus located in said lower compartment, said elongated container including inlet means for introducing the liquid to be distilled into said upper compartment.

18. The apparatus as recited in claim 17, wherein said elongated container includes outlet means for removing liquid to be distileld concentrated with substances to be removed therefrom in said lower compartment.

19. The apparatus as recited in claim 17, and comprising a plurality of said apparatus adjacently arranged to form a composite apparatus, adjacent apparatus having common compartments for receiving condensed liquid.

20. The apparatus as recited in claim 19, and comprising means for recycling the liquid concentrated with substances in at least one successive apparatus, recycled liquid being introduced into said successive apparatus to replace at least in part liquid to be distilled, whereby part of the heat of the recycled liquid is recuperated and the liquid is further concentrated with substances.

21. The apparatus as recited in claim 16, wherein said conduit means and said Fresnel-type lenses are disposed adjacent each other and are substantially parallel to each other.

22. The apparatus as recited in claim 21, wherein said conduit means and said Fresnel-type lenses are inclined at an angle of from about 5° to about 20° with the horizontal.

23. The apparatus as recited in claim 16, wherein said conduit means and said Fresnel-type lenses are spaced and disposed at an acute angle with each other, said conduit means being disposed at an angle of from about 5° to about 20° with the horizontal and said Fresnel-type lenses being disposed at an angle of up to 60° with the horizontal.

24. The apparatus as recited in claim 14 and comprising a flexible, dark material which is impermeable to the liquid to be distilled disposed on the bottom of said containing means and which is operative to absorb solar energy to produce heat and transfer such heat to the water to be distilled.

25. The apparatus as recited in claim 24, wherein said material is disposed on suitably worked ground and forms the bottom of said containing means.

26. The apparatus as recited in claim 1, and comprising a heat exchange fluid passed through said conduit means and heat exchanging means for transferring heat from the fluid in said conduit means to the liquid to be distilled.

27. The apparatus as recited in claim 26, wherein said heat exchanging means comprises a heat exchanger comprising a first circuit for the liquid to be distilled including a first inlet for the introduction of the liquid to be distilled into said circuit and a first outlet connected to the interior of said containing means; and a second circuit for the heat exchange fluid including a second inlet and a second outlet connected to the interior of said conduit means.

28. The apparatus as recited in claim 1, and comprising a solar energy heating means for preheating the liquid to be distilled before the liquid is introduced into said containing means.

29. The apparatus as recited in claim 1 wherein the lens means comprises at least one fluid lens.

30. Apparatus as recited in claim 1 and including a heat exchange fluid passed through said conduit means and means for passing a quantity of fluid through said conduit means which exceeds substantially the quantity of liquid evaporated and condensed on said conduit means as to enable the fluid in the conduit means to carry the heat of condensation released by the condensing liquid while maintaining the temperature of the fluid lower than the temperature of the liquid vapor.

31. The apparatus as recited in claim 1, wherein said containing means comprises a container including side and end walls and a bottom surface inclined with respect to the horizontal, at least one baffle being disposed in said container to provide at least two compartments in said container for holding liquid to be distilled, inlet means being disposed in an upper of said compartments for introducing liquid to be distilled therein and outlet means being disposed in a lower of said compartments for removing a concentrate of the liquid being distilled, whereby liquid to be distilled can be introduced into the upper compartment, conducted to the lower compartment and removed from the lower compartment.

* * * * *

UNITED STATES PATENT AND TRADEMARK OFFICE
CERTIFICATE OF CORRECTION

PATENT NO. : 4,270,981
DATED : June 2, 1981
INVENTOR(S) : Virgil Stark

It is certified that error appears in the above—identified patent and that said Letters Patent is hereby corrected as shown below:

Column 4, line 16, change "asepect" to --aspect--;

line 33, change "pretroleum" to --petroleum--.

Column 5, line 49, change "substantilly" to --substantially--;

line 51, change "othe" to --other--;

lines 66-67, change "preventing" to --prevent--.

Column 6, line 34, change "the" to --The--;

line 49, change "lenght" to --length--;

lines 60-61, change "negliglble" to --negligible--.

UNITED STATES PATENT AND TRADEMARK OFFICE
CERTIFICATE OF CORRECTION

PATENT NO. : 4,270,981

DATED : June 2, 1981

INVENTOR(S) : Virgil Stark

It is certified that error appears in the above—identified patent and that said Letters Patent is hereby corrected as shown below:

Column 7, line 67, change "Heater" to --Heated--.

Column 8, line 3, change "donwardly" to --downwardly--;

line 14, change "enhcance" to --enhance--.

Column 9, line 25, change "93" to --92--.

Column 11, line 38, change "a" (first occurrence) to --at--;

line 62, after "is" insert --:--.

Column 13, line 27, change "substance" to --substances--;

line 43, change "4" to --14--.

Column 14, line 6, change "distilleld" to --distilled--.

Signed and Sealed this

Tenth Day of November 1981

[SEAL]

Attest:

GERALD J. MOSSINGHOFF

Attesting Officer — Commissioner of Patents and Trademarks